(12) United States Patent
Lillis (10) Patent No.: US 7,311,116 B2
(45) Date of Patent: Dec. 25, 2007

(54) GAS REGULATION SYSTEM AND PROCESS FOR OPERATING THE GAS REGULATION SYSTEM

(75) Inventor: Mark Andrew Lillis, South Windsor, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 258 days.

(21) Appl. No.: 10/707,390

(22) Filed: Dec. 10, 2003

(65) Prior Publication Data

US 2005/0126642 A1   Jun. 16, 2005

(51) Int. Cl.
*F17D 1/00* (2006.01)
(52) U.S. Cl. ....................... 137/256; 137/266
(58) Field of Classification Search ................ 137/256, 137/255, 266, 263; 141/2, 3, 4, 18, 21, 102, 141/198, 197, 237
See application file for complete search history.

(56) References Cited

U.S. PATENT DOCUMENTS

| 2,793,813 | A | * | 5/1957 | Belcher, Jr. ............... 236/15 R |
| 3,322,135 | A | * | 5/1967 | Watson ........................ 137/113 |
| 3,719,196 | A | * | 3/1973 | McJones ...................... 137/110 |
| 4,645,908 | A | * | 2/1987 | Jones .......................... 392/340 |
| 4,958,659 | A | * | 9/1990 | Dowdall ................. 134/624.12 |
| 5,323,752 | A | * | 6/1994 | von Herrmann et al. ... 123/527 |
| 6,651,701 | B2 | * | 11/2003 | Kuriiwa et al. ................. 141/4 |
| 2002/0092575 | A1 | * | 7/2002 | Takeda et al. .............. 137/877 |
| 2002/0094469 | A1 | * | 7/2002 | Yoshizumi et al. ........... 429/34 |
| 2002/0125998 | A1 | * | 9/2002 | Petite et al. ........... 340/286.01 |
| 2002/0134342 | A1 | * | 9/2002 | Agricola et al. ......... 123/198 D |
| 2002/0148502 | A1 | * | 10/2002 | Fujita .......................... 137/266 |

* cited by examiner

*Primary Examiner*—Gregory Huson
*Assistant Examiner*—Craig Schneider
(74) *Attorney, Agent, or Firm*—Cantor Colburn LLP

(57) ABSTRACT

A gas regulation system includes a manifold, a plurality of control modules in fluid communication with the manifold, and a power source. Each control module includes an actuatable valve that is in fluid communication with an associated gas storage device and in electrical communication with the power source. The power source is adapted to prevent more than one of the actuatable valves from simultaneously having an actuated state.

14 Claims, 7 Drawing Sheets

FIG. 7 ated state.

GAS REGULATION SYSTEM AND PROCESS FOR OPERATING THE GAS REGULATION SYSTEM

BACKGROUND OF INVENTION

The present disclosure relates to pressurized gas storage devices, and more specifically to a manifold assembly for regulating the pressurized gas storage devices of an electrochemical cell system.

Figure 1:
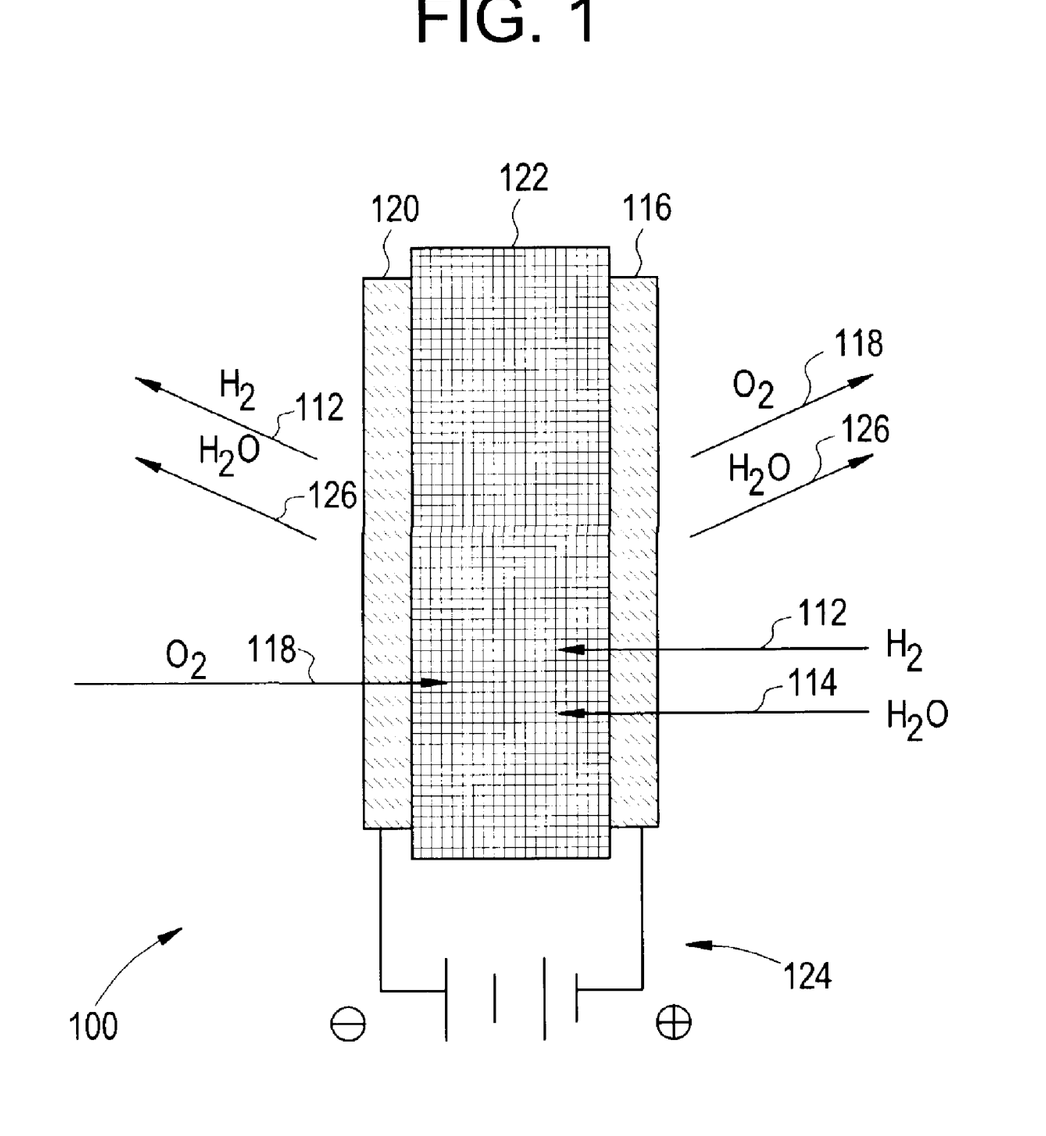
FIG. 1 is a schematic of a proton exchange membrane fuel cell for use in embodiments of the invention.

Electrochemical cells are energy conversion devices, usually classified as either electrolysis cells or fuel cells. Proton exchange membrane electrolysis cells can function as fuel cells by electrochemically reacting hydrogen with oxygen to generate electricity and as hydrogen generators by electrolytically decomposing water to produce hydrogen and oxygen gases. Referring to FIG. 1, a section of a proton exchange membrane fuel cell is shown generally at 100 and is hereinafter referred to as "cell 100" or more generally as "electrochemical cell 100." In cell 100, hydrogen gas 112 and reactant water 114 are introduced to a hydrogen electrode (anode) 116, while oxygen gas 118 is introduced to an oxygen electrode (cathode) 120. Hydrogen gas 112 for fuel cell operation can originate from a hydrocarbon, natural gas, or any other hydrogen source. Hydrogen gas 112 electrochemically reacts at anode 116 to produce hydrogen ions (protons) and electrons such that the electrons flow from anode 116 through an electrically connected external load 124 and such that the protons migrate through a membrane 122 to cathode 120. At cathode 120, the protons and electrons react with the oxygen gas to form water 126, which additionally includes any reactant water 114 that migrates through membrane 122 to cathode 120. The electrical potential across anode 116 and cathode 120 can be exploited to power an external load 124.

A similar configuration as is depicted in FIG. 1 for a fuel cell is often used for electrolysis cells. In an anode feed water electrolysis cell (not shown), reactant water is fed to a cell at an oxygen electrode (anode) to form oxygen gas, electrons, and hydrogen ions (protons). The electrolytic reaction is facilitated by the positive terminal of a power source electrically connected to the anode and the negative terminal of the power source connected to a hydrogen electrode (cathode). The oxygen gas and a first portion of the water are discharged from the cell, while protons and a second portion of the water migrate across a proton exchange membrane to the cathode where hydrogen gas is formed. In a cathode feed electrolysis cell (not shown), water is fed at the hydrogen electrode, and a portion of the water migrates from the cathode across the membrane to the anode where protons and oxygen gas are formed. A portion of the water is discharged from the cell at the cathode side without passing through the membrane. The protons migrate across the membrane to the cathode where hydrogen gas is formed.

An electrochemical cell system (either a fuel cell system or an electrolysis cell system) includes one or more individual cells arranged in a stack with the working fluid directed through the cells via input and output conduits formed within the stack structure. The cells within the stack are sequentially arranged in ionic communication, each including a cathode, a proton exchange membrane, and an anode. In certain arrangements, the anode, cathode, or both are gas diffusion electrodes that facilitate gas diffusion to the membrane. Each cathode/membrane/anode assembly (hereinafter "membrane electrode assembly," or "MEA") may be supported on one or both sides by flow fields that may comprise screen packs and/or bipolar plates. Such flow fields facilitate fluid movement and membrane hydration and provide mechanical support for the MEA. Because a differential pressure often exists in the cells, compression pads or other compression means are often employed to maintain uniform compression in the cell active area, i.e., the electrodes, thereby maintaining intimate contact between flow fields and cell electrodes over long time periods.

While existing electrochemical cell systems are suitable for their intended purposes, there still remains a need for improvements. Some of the improvements needed include a more flexible array of hydrogen gas storage devices and methods to allow for the addition or deletion of a storage device, wherein a control scheme monitors the complete storage system through a simplified electrical and fluid interconnect structure.

SUMMARY OF INVENTION

A gas regulation system includes a manifold, a plurality of control modules in fluid communication with the manifold, and a power source. Each control module includes an actuatable valve that is in fluid communication with an associated gas storage device and in electrical communication with the power source. The power source is adapted to prevent more than one of the actuatable valves from simultaneously having an actuated state.

A process for operating a gas regulation system is disclosed. The gas regulation system includes a manifold, a plurality of control modules in fluid communication with the manifold, and a power source in electrical communication with the plurality of control modules. Each of the control modules includes an actuatable valve in fluid communication with an associated gas storage device, and a circuit comprising a switch in electrical communication with the actuatable valve and the power source. A selected one of the switches is closed, and the circuit defined by the closed switch is energized to open the actuatable valve. The energized circuit is supplied power to enable actuation of the actuatable valve, where the supplied power is insufficient to actuate the actuatable valve if more than one switch is closed.

The above described and other features are exemplified by the following figures and detailed description.

BRIEF DESCRIPTION OF DRAWINGS

Referring now to the figures, which are exemplary embodiments and wherein the like elements are numbered alike.

DETAILED DESCRIPTION

Disclosed herein is a gas regulation system for use with an electrochemical cell system. The electrochemical cell system may include a plurality of fuel cell stacks, electrolyzers, and the like. Although reference is made to the electrochemical cell system, it is contemplated that the gas regulation system may be employed for other types of systems employing a manifold and two or more pressurized gas storage devices. While embodiments of the invention described herein depict a storage device for hydrogen gas, it will be appreciated that other embodiments of the invention may be applied to other gases, such as oxygen for example.

Figure 2:
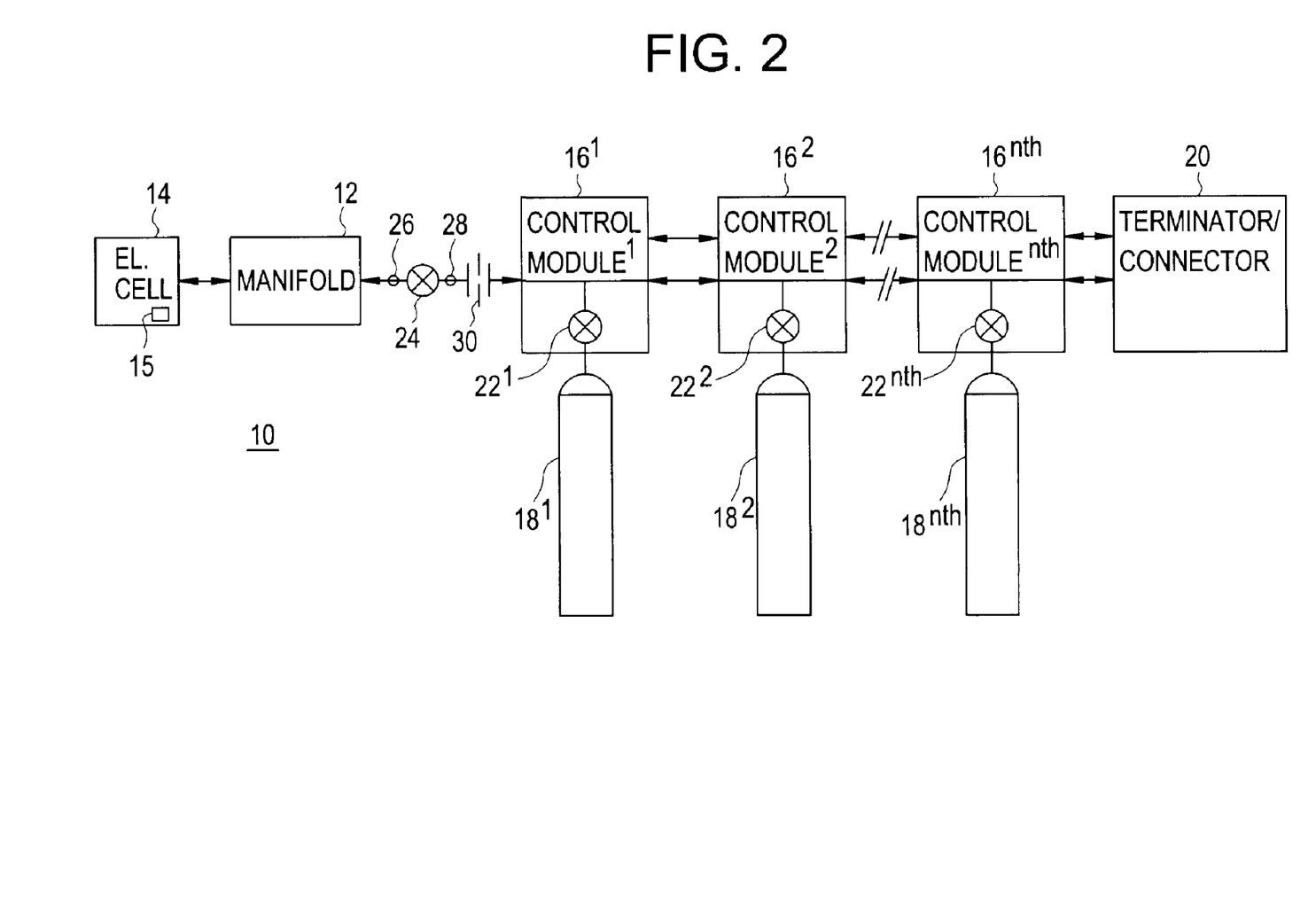
FIG. 2 is a schematic diagram of a manifold assembly.

Referring now to FIG. 2, the gas regulation system, generally designated by reference numeral 10, generally comprises a main manifold 12 for receiving and discharging hydrogen gas from/to an electrochemical cell system 14 and from/to an array of serially connected control modules generally designated 16 (for example, 161, 162, . . . 16nth). Electrochemical cell system 14 may include one or more electrochemical cells 100, with gas flow control being managed by manifold 12. As used herein, superscripts refer to one of a plurality of similar devices. The number of control modules 16 depends on the amount of gas storage needed for the electrochemical cell system 14. Each one of the control modules 16 comprises a hydrogen gas storage device 18 (for example, pressurized gas canisters 181, 182, . . . 18nth). An actuatable valve 22 is disposed between the control module 16 and the hydrogen gas storage device 18. A terminator connector 20 may be provided at a terminal end of the gas regulation system 10, that is, located distally from the main manifold 12, and is in operative communication with the last control module in the series of control modules 16. The terminator connector 20 completes a circuit for controlling the gas regulation system 10.

In an embodiment, the gas regulation system 10 is adapted to receive a hydrogen gas flow into the main manifold 12 at pressures of up to, or exceeding, about 2,000 pounds per square inch (psi) with a capability of storing hydrogen gas at pressures of up to, or exceeding about 10,000 psi more preferred. The desired hydrogen storage pressure may be achieved through the use of an electrolyzer alone or in concert with a pressure boosting system 15 (for example, a compressor) within the fuel cell system 14. Alternatively, or in addition, the hydrogen gas storage device 18 may include mechanical or other pressure increasing methods, including metal hydride pumping or proton exchange membrane (PEM) based pumping systems. Any pumping system may use a single stage or multiple stages to achieve final compression level. The compression techniques may be used in various combinations or quantities to achieve the required compression within the system.

In an embodiment, the gas regulation system 10 is adapted to discharge hydrogen gas at pressures of about 200 psi or less depending on the requirements and design of the fuel cell system 14. Fuel cell sub-systems are generally designed to operate at pressures of about 200 psi or less.

The gas regulation system 10 further includes valve 24 that may be preferably disposed between the main manifold 12 and the first serially connected control module 161. In an embodiment, pressure sensors 26 and 28 are disposed before and after valve 24. Intermediate pressure sensor 28 and the first control module 161 is a directional pressure-reducing valve 30 (shown more clearly in FIGS. 5 and 6). As will be discussed in greater detail later, the directional pressure-reducing valve 30 reduces the pressure of hydrogen gas flowing from the first control module 161 to the main manifold 12. In this manner, hydrogen gas can flow into the gas regulation system 10 at pressures up to about 10,000 psi and can be discharged to the fuel cell system 14 at pressures less than about 200 psi. Optionally, redundant directional pressure-reducing valves 32, best seen by referring to FIG. 4, similar to valve 30 may be provided in each control module 16 between the hydrogen gas storage device 18 and its respective control module 16 to reduce the pressure flowing from the hydrogen gas storage device 18 through the control modules 16. The use of redundant directional pressure-reducing valves 30, 32 can improve failure mode characteristics in the event of a fitting failure or the like.

Figure 3:
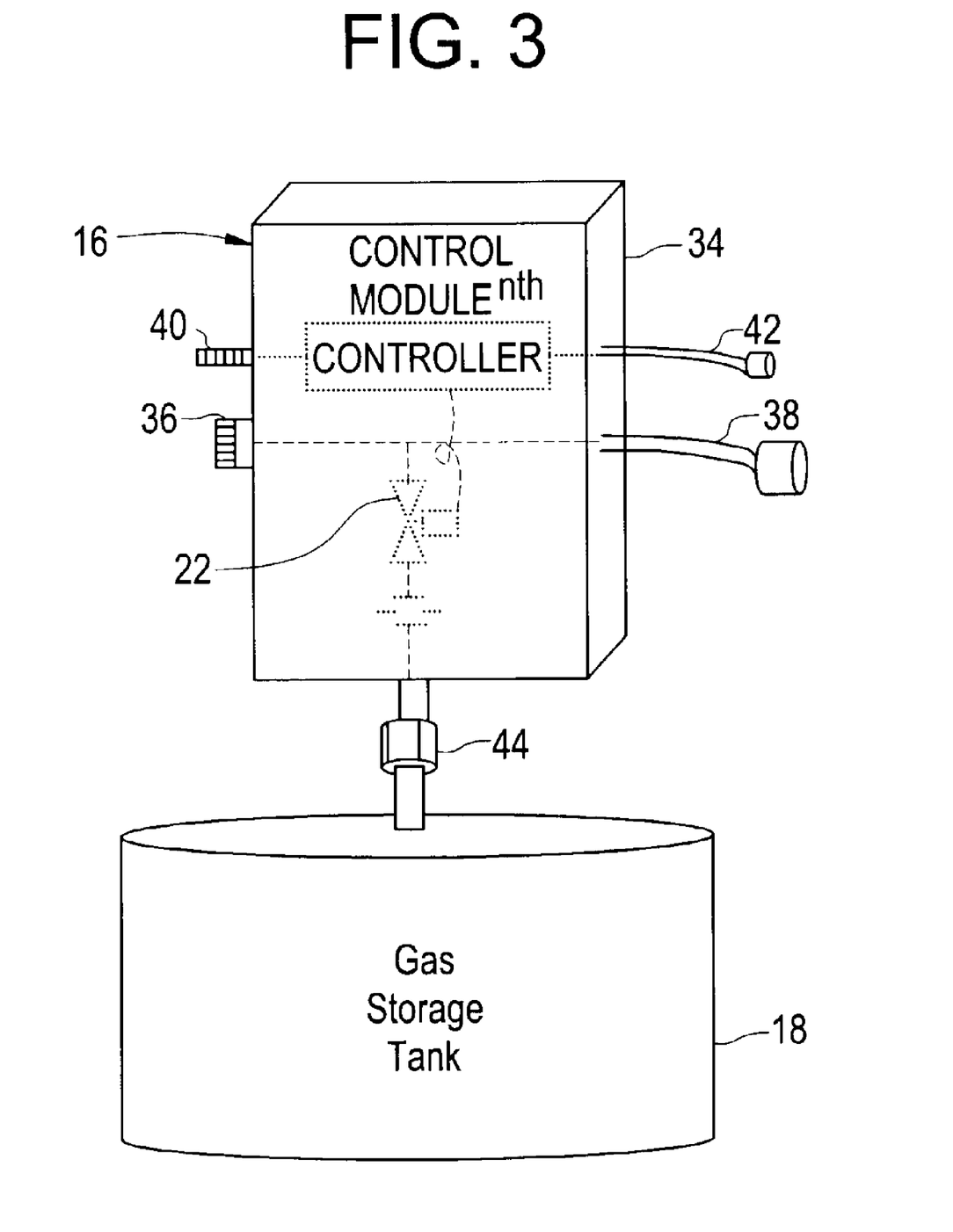
FIG. 3 is a perspective view of a control module.
Figure 4:
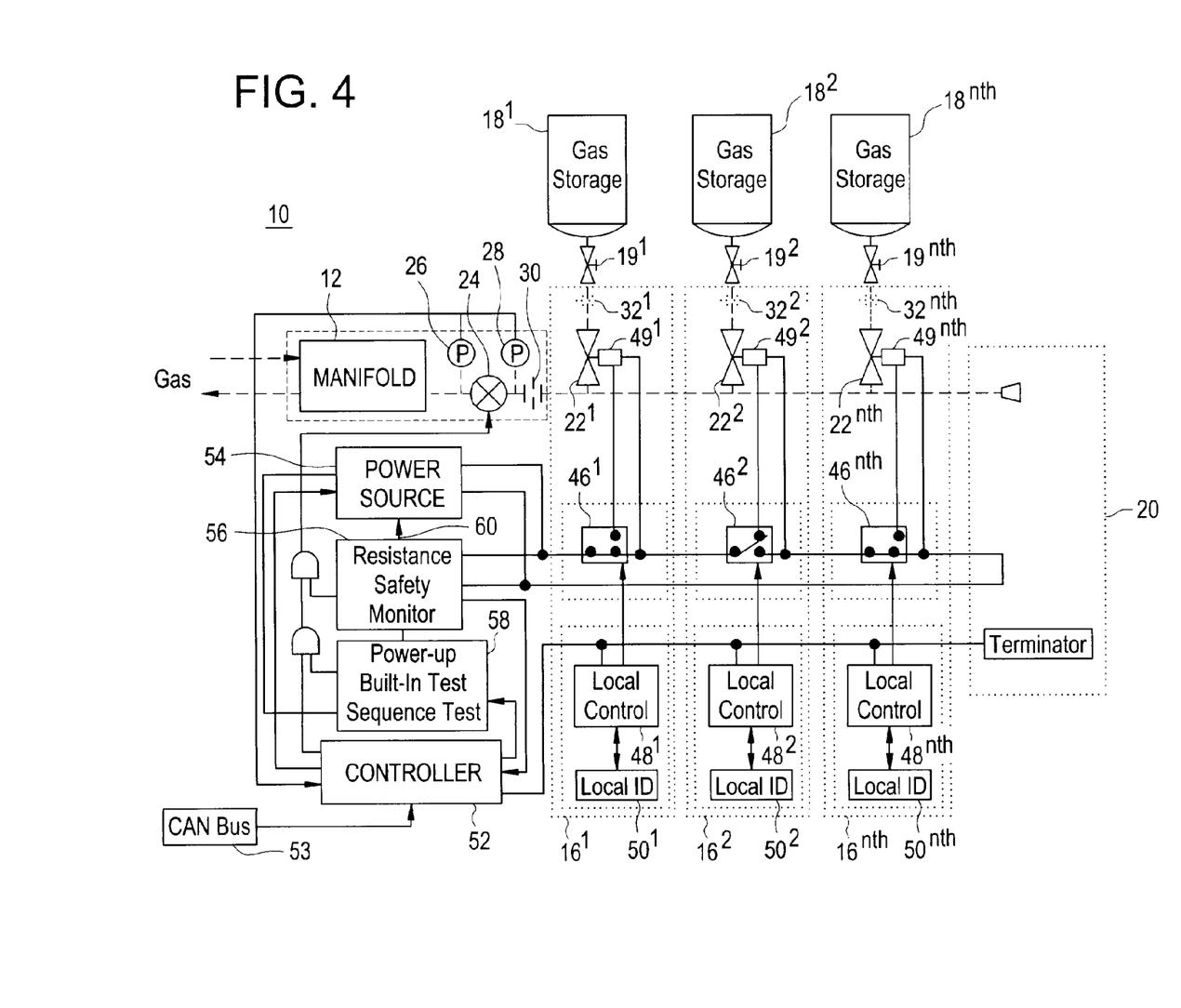
FIG. 4 is a schematic diagram of a manifold assembly.

As shown in FIGS. 3 and 4, each one of the control modules 16 generally comprises hardware and circuitry means for providing on demand fluid communication of the hydrogen gas storage device 18 with the gas regulation system 10. In an embodiment, the hardware means comprises a housing 34 from which a male hydrogen gas connector 36 and female hydrogen gas connector 38 extend therefrom. The male hydrogen gas connector 36 and female hydrogen gas connector 38 are fluidly connected within the housing 34 and are adapted to provide fluid communication to an adjacent smart control module 16nth, or to the main manifold 12. During operation of the gas regulation system 10, hydrogen gas flows through the hydrogen gas connectors 36, 38 between the serially connected control modules 16 and the main manifold 12. Control module 16 further includes male and female electrical connectors 40, 42, respectively, extending from the housing 34. The male electrical connector 40 can be configured with pins, as shown, to provide electrical communication with a selected one of the adjacent control modules 16. The female electrical connector 42 preferably comprises multiple complementary sockets adapted to receive the pins of the male connector 40. Each control module 16 also includes a hydrogen gas storage device connector 44. The hydrogen gas storage device connector 44 is adapted to be fluidly connected to the hydrogen gas storage device 18 to provide fluid communication between the hydrogen gas storage device 18 and the hydrogen gas connectors 36 and 38. Preferably, the hydrogen gas storage device connector 44 comprises a nut and tube assembly, as is generally standard practice for connecting a fluid conduit to a pressurized gas canister, such as hydrogen gas storage device 18 for example. An optional manual shutoff valve 19 may be disposed intermediate to the hydrogen gas storage device connector 44 and the hydrogen gas storage device 18.

Intermediate to the male and female hydrogen gas connectors 36, 38 and the hydrogen gas storage device connector 44 is the actuatable valve 22, preferably located within the housing 34. Optionally, valve 22 could be externally positioned outside the housing 34 in operative communication with the hydrogen gas storage device connector 44. In an embodiment, actuatable valve 22 may be a solenoid actuated valve that is in electrical communication with the electrical connectors 40, 42 to provide actuation means to the valve 22, which is also in fluid communication with the male and female hydrogen gas connectors 36, 38 and the hydrogen gas storage device connector 44. As such, each solenoid valve 22 in the control module 16 is in electrical communication with an adjacent solenoid valve 22nth in an adjacent control module 16nth as well as a manifold controller 52 for controlling the actuation of the valves 22.

In an embodiment, the circuitry provided for each control module 16 includes a switch 46, such as a relay switch, solid state switch, or the like, in electrical communication with a solenoid coil 49 having a defined resistance for opening and closing the actuatable valve 22. The switch 46 is in electrical communication with a local control-processing unit 48. Each local control-processing unit 48 is preferably controlled by a distributed bus signal such as a CAN (controller are network) bus or EPLD (erasable and programmable logic device) controller that receives signals from the manifold controller 52. The manifold controller 52 would then interface with the rest of the system 10 via the bus or controller and act as a hydrogen delivery object. The manifold controller 52 would enforce the safety rules defined for each control module 16 included in the gas regulation system 10.

In an embodiment, each one of the hydrogen gas storage devices 18 has a unique identifier 50, for example, a serial number or like identifier, that is programmed into the local control-processing unit 48, which can be read by a manifold controller 52, in electrical communication with the serially connected control modules 16. The use of a unique identifier 50 may be assigned at the factory to allow for tracking storage device lifetime and inventory. With storage device lifetime data, a method to automatically inventory and dispatch replacement hydrogen gas storage devices 18 may be implemented. The identifier 50 may also allow the manifold controller 52 to create a dynamic control scheme that can manage additions and deletions of control modules 16 to the gas regulation system 10. An algorithm may be employed to query and maintain a list of storage devices 18 online and sequence these devices 18 as needed during fill and/or drain cycles.

In an embodiment, controller 52 may also communicate with a computer and/or server (not shown) external to system 10 via CAN Bus 53. The information on the status, life, and maintenance of tank 18 may be transmitted to local controller 48, remote controller 52, or to the computer and/or server for notification and/or data warehousing, and/or data logging, for long term trend analysis and/or for service dispatch.

Each circuit of the control modules 16 is connected, in series, to a power source 54. As previously discussed, the terminator connector 20 completes the circuit path for the serially connected control modules 16. A resistance safety monitor device 56 is preferably disposed in electrical communication with the power source 54 to monitor the power provided to the circuitry. The manifold controller 52 is preferably disposed in operative communication with the power source 54 and the resistance safety monitor 56 to provide the ground rules for the gas regulation system 10. A safety power shutoff 60 may be disposed between the resistance safety monitor 56 and the power source 54 to provide an interruption of power to the control modules circuitry, such as in the event of a system failure or other actionable event calling for no gas flow. Manifold controller 52 is configured to provide operational logic for selectively opening and closing the appropriate actuatable valve 22. For example, the manifold controller 52 may include a programmable logic device for defining the power required to actuate one solenoid valve 22 in the system 10 and bring online a selected one of the control modules 16. The gas regulation system 10 may further include a built-in test and sequence test module 58 to insure that the gas regulation system 10 is working properly at start-up and that none of the valves 22 are stuck open or closed. The built-in test and sequence test module 58 is in electrical communication with the manifold controller 52, the resistance safety monitor 56, and the power source 54. While embodiments are disclosed herein having a resistance safety monitoring device 56, it will be appreciated that device 56 may be an impedance safety monitoring device, such that an impedance rather than a resistance is monitored and acted upon.

In operation, a set number of control modules 16 are determined for use in the gas regulation system 10. With this information, the amount of power (or voltage or resistance) can be readily determined that would be sufficient to actuate a single valve 22 in the series of control modules 16. The power device 54 delivers power to a closed switch 46 (determined by the manifold controller 52) to provide power to the solenoid coil 49 within the CAN bus or EPLD controller. The total resistance of the hydrogen gas storage devices 18 serially connected to the gas regulation system 10 may then be calculated by the resistance safety monitor 56. So long as the current is within a defined range as determined by the resistance of the solenoid coil 49, the valve 22 can be selectively opened to provide fluid communication between the hydrogen gas storage device 18 and the main manifold 12 via the control module 16. If the resistance is not within the range of one solenoid valve 22 being "ON", then the manifold controller 52 will interrupt the hydrogen gas storage device solenoid high side power. If the resistance is within the range, then solenoid coil 49 actuates the valve 22 to open. The interlock provided by the control modules 16 is hardware enforced so that faulty software cannot expose the electrochemical cell system 14 to having more than one hydrogen gas storage device 18 open at a time. The interlock for gas flow may comprise an electrical series of resistances such that each one of the actuatable valves 22 via solenoid coil 49 in the control modules 16 adds in a fixed resistance when actuated. In the event that one of the switches 46 remains closed and/or one of the valves 22 remains stuck open, the power source 54 would not provide sufficient power to simultaneously actuate a second actuatable valve 22 to open, even if additional switches 46 are closed. Thus, more than one valve 22 will not be simultaneously open within the gas regulation system 10.

As previously discussed, if the power, (or resistance measured) is not within the range of the selected actuatable valve 22 programmed to be actuated, then the manifold controller 52 will interrupt the solenoid high side power at switch 46 via the local control-processing unit 48. A safety shutoff 60 may optionally be disposed between the resistance safety monitor device 56 and the power source 54 to provide a secondary means for interruption of power to the control modules 16, if needed. Thus, the gas regulation system 10 can be shutdown in the event of a gas leak, upon installation of an additional control module and hydrogen gas storage device, maintenance, or the like.

In an alternative embodiment, the hydrogen gas storage device 18 and control module 16 comprise a resistive based pressure sensor (not shown) connected in series with the other hydrogen gas storage devices. The resistive element is shorted out in all but one of the control modules 16, that is, the storage device being addressed or commanded via the bus would not be shorted out. This alternative embodiment permits continuation of the daisy chain approach and allows for the reading of any pressure with just one analog/digital device. A built-in test could be performed on the system by commanding all of the resistive elements to short thereby allowing confirmation of a complete connection. A sequence test may then be performed to assure that all storage devices can be read. Any storage device that does not pass the test can be deemed faulty by the gas regulation system 10 and skipped in the operational fill discharge processes.

In another embodiment, the command voltage, via controller 52 and power source 54, for actuating a solenoid 49 is set such that it is too low to activate two or more solenoids 49 electrically connected in series, but has sufficient margin for actuating a single solenoid 49.

The hydrogen gas storage devices 18 may be formed of any material capable of withstanding the desired pressures. Some possible materials include ferrous materials (such as steel, for example, stainless steel, and the like) titanium, carbon (for example, woven carbon fiber materials, and the like), plastics, any other comparable high-strength materials, as well as composites, alloys, and mixtures comprising at least one of the foregoing materials. Furthermore, the device 18 may be lined with sealant(s), surface finish(es), coating, or the like, to prevent corrosion or other tank material-related contamination from communicating with the hydrogen or any condensate in the device, and to prevent the contamination to various components of the electrochemical cell system 14.

In an alternative embodiment, an electrolyzer may be disposed directly to the control module 16. Preferably, the electrolyzer is disposed intermediate to valve 22 and the hydrogen gas connectors 36, 38.

Hydrogen gas drying techniques may be employed as part of a hydrogen storage system 18. These drying systems may include, for example, desiccant based drying schemes (for example, a swing bed adsorber, and other desiccant based absorbers), phase separators, membrane drying systems (for example, palladium diffusers, and the like), coalescing filters, condensing systems (for example, utilizing thermal electric cooler, vortex tube coolers, vapor or air cycle refrigeration system, and the like), and the like, as well as combinations comprising at least one of the foregoing drying systems.

Figure 5:
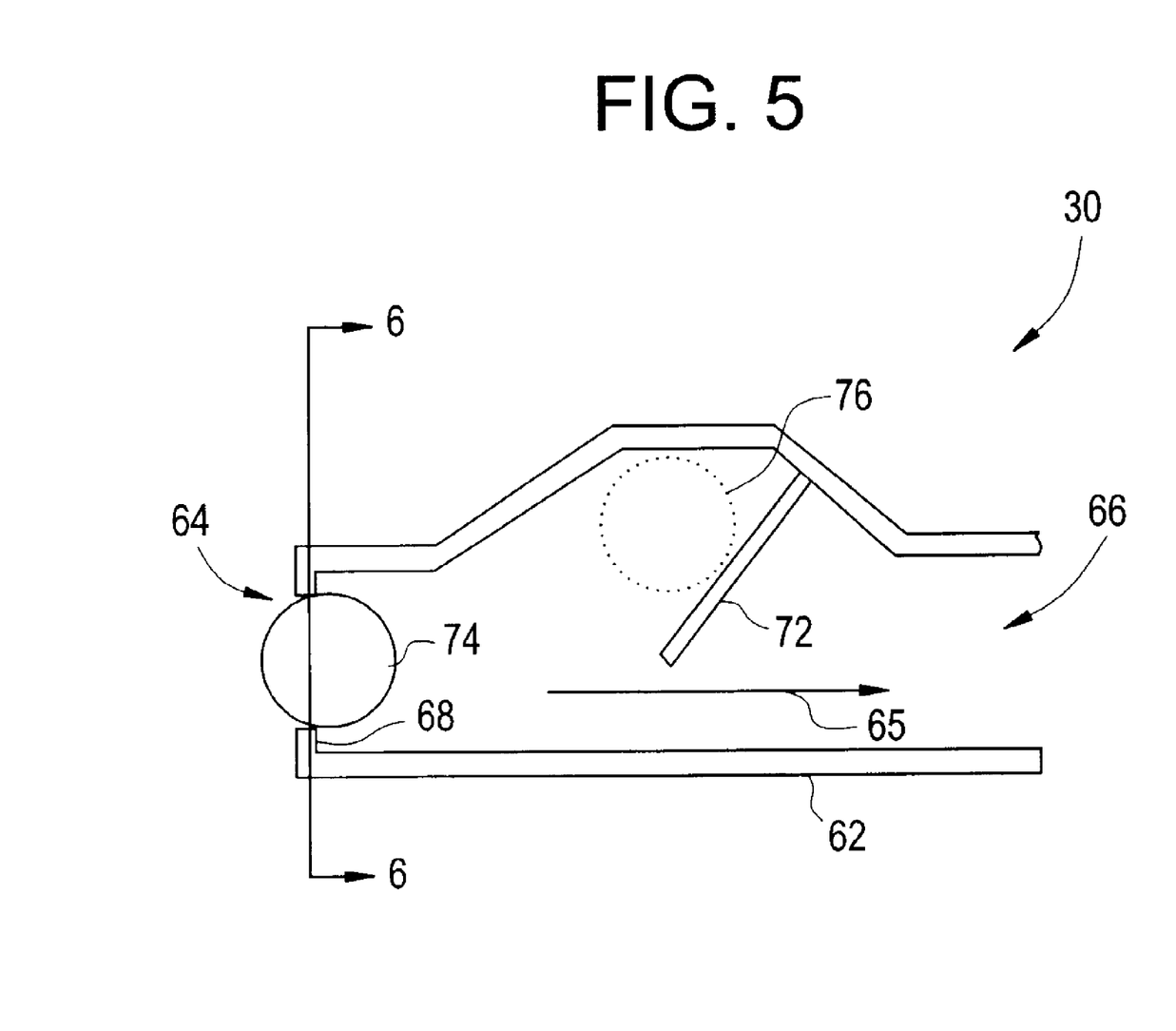
FIG. 5 is a perspective view illustrating an exemplary directional pressure-reducing valve.
Figure 6:
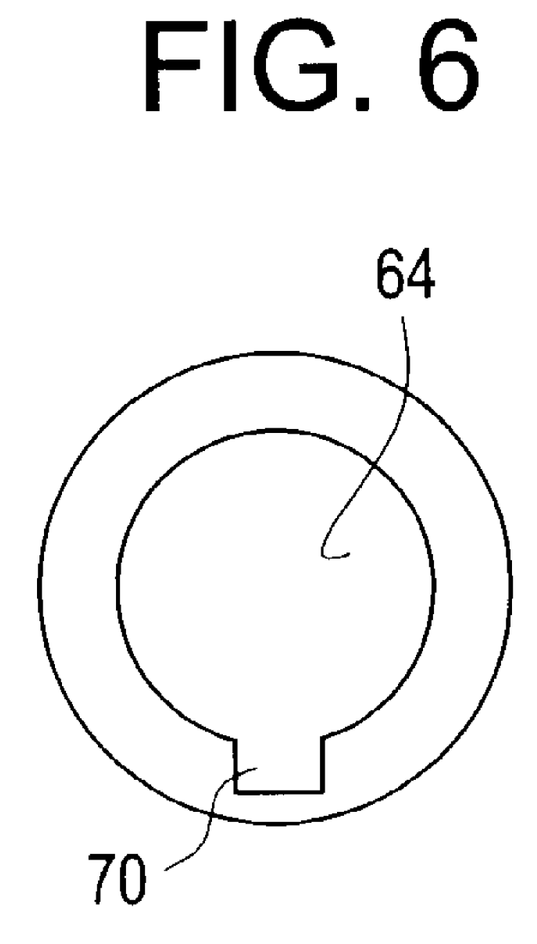
FIG. 6 is a cross sectional view of the directional pressure-reducing valve taken along lines 6-6 of FIG. 5.

Referring now to FIGS. 5 and 6, there is depicted an exemplary directional pressure-reducing valve 30 (or 32). Although reference is made to the exemplary directional pressure-reducing valve, other types of valves may be used, including other types of ball valves, check valves, and the like. The directional pressure-reducing valve 30 reduces the pressure of a gas flowing from the control module 16 to the main manifold 12 (for example, at about 200 psi or less) whereas gas flowing from the main manifold 12 to the control module 16 would flow substantially unimpeded (for example up to or exceeding about 2,000 psi, with up to, or exceeding about 10,000 psi more preferred). Preferably, the directional pressure-reducing valve 30 comprises an open-ended sleeve 62 having an inflow opening 64 and an outflow opening 66. The inflow opening 64 comprises a seat 68 radially extending inwardly about the opening 64. An opening 70, preferably a slot, is provided in the seat 68. A finger 72 radially projects inwardly from an interior of the sleeve 62. A ball 74 is disposed intermediate to the seat 68 and finger 72. When gas is flowing from the main manifold 12 to the control module 16 (that is, gas flowing as indicated by the arrow 65), the ball 74 moves in response to the flow of gas to a cavity 76 defined by the finger 72 and the interior of the sleeve 62. As a result, the flow of gas from the inflow opening 64 to the outflow opening 66 is substantially unimpeded and at a relatively high pressure. In contrast, when flow of gas is from the outflow opening 66 to the inflow opening 64, (for example, from the control module 16 to the main manifold 12) the ball 74 seats against the seat 68. The slot opening 70 provides a restricted fluid passageway and reduces the pressure of the gas flow.

Figure 7:
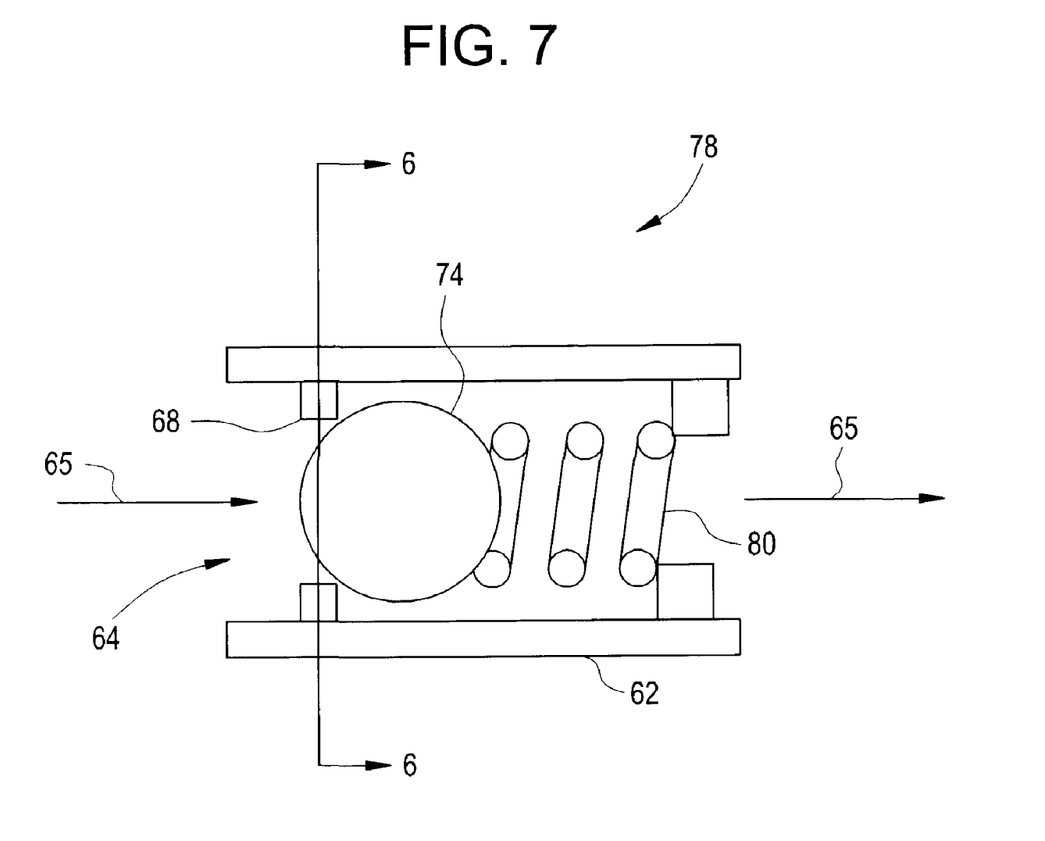
FIG. 7 is an alternative directional pressure-reducing valve to that depicted in FIG. 5.

Referring now to FIG. 7, an alternative pressure-reducing valve 78 is depicted. Here, ball 74 is biased toward seat 68 via spring 80. In response to gas flow in the direction of arrow 65, the high pressure gas unseats ball 74 from seat 68, resulting in the compression of spring 80 and a substantially unimpeded high pressure gas flow from main manifold 12 to control module 16. In response to gas flow from control module 16 to main manifold 12, ball 74 is driven against seat 68, resulting in substantially impeded low pressure gas flow through slot opening 70.

The gas regulation system 10 provides an expandable array of hydrogen gas storage devices 18 and control modules 16 that interlock to prevent the commanding of more than one hydrogen gas storage device 18 at a time. The interlock provided by the control modules 16 is hardware enforced so that faulty software cannot expose the electrochemical cell system 14 to having more than one hydrogen gas storage device 18 open at a time. In this manner, the gas regulation system 10 advantageously limits the leak rate in the event of a leak or other failure, such as in the event of a system malfunction that would lead to the release of hydrogen gas. Thus, the gas regulation system 10 allows for large quantities of hydrogen gas to be interconnected in a manifold arrangement to the electrochemical cell system 14 while maintaining the same safety level as having only one hydrogen gas storage device 18. The hydrogen gas storage devices 18 can be brought online or offline, as desired, by simply connecting or disconnecting its control module 16 and respective hydrogen gas storage device 18 to the gas regulation system 10.

In an alternative embodiment, electrochemical cell 14, such as a small portable electrolyzer for example, may be mounted directly to hydrogen gas storage device 18 via valve system 19 or 24, and 30, thereby providing a modular arrangement of electrochemical cell 14 and hydrogen gas storage 18 with shut off valving and pressure-reduction valving. In a further alternative embodiment, electrochemical cell 14, such as a small portable electrolyzer for example, may be mounted directly to manifold 12 and valve system 24, 30, thereby providing a modular arrangement of electrochemical cell 14 and manifold 12 for rapid coupling to one or more control modules 16 and hydrogen gas storage devices 18, with integrally arranged shut off valving and pressure reduction valving.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A gas regulation system, comprising:
    a manifold;
    a plurality of control modules in fluid communication with the manifold, wherein each of the control modules comprises an actuatable valve in fluid communication with an associated gas storage device, each of the actuatable valves having a known resistance in an actuated state, and a local control-processing unit in electrical communication with a manifold controller;
    a resistance-based interlock defined by an electrical series of resistances of each of the actuatable valves, the interlock being active in response to one of the actuatable valves being in an actuated state, thereby defining a threshold resistance comprising the known resistance;
    a power source in electrical communication with each of the actuatable valves, the power source having a power output insufficient to overcome the threshold resistance, thereby preventing more than one of the actuatable valves from simultaneously having an actuated state; and each gas storage device comprising a unique identifier readable by the manifold controller.

2. A gas regulation system, comprising:

a power source;

a manifold;

a plurality of control modules, each of the control modules comprising:
  a processing unit responsive to an external control signal; and
  an actuatable valve responsive to the processing unit and the power source, and adapted for fluid communication between a gas storage device and the manifold, the actuatable valve having a known resistance in an actuated state;

a resistance-based interlock defined by an electrical series of resistances of each of the actuatable valves, the interlock being active in response to one of the actuatable valves being in an actuated state, thereby defining a threshold resistance comprising the known resistance;

wherein the power source has a power output insufficient to overcome the threshold resistance, thereby preventing more than one of the actuatable valves from simultaneously having an actuated state;

wherein only one of the actuatable valves opens to provide fluid communication between the gas storage device and the manifold in response to a signal from the processing unit and in the absence of another of the actuatable valves of a second control module of the plurality of control modules being open.

3. The control module of claim 2, further comprising:

a switch in signal communication with the processing unit and adapted to receive power from the power source; and an impedance device disposed between the switch and the actuatable valve;

wherein the actuatable valve is responsive to the impedance device for switching between a closed and an open position;

wherein the power from the power source is sufficient to drive no more than one impedance device to an actuatable state for opening the actuatable valve; and wherein the actuatable valve opens to provide fluid communication between the gas storage device and the manifold in response to the impedance device being driven to the actuatable state.

4. The control module of claim 3, further comprising:

a first gas connector and a second gas connector, each gas connector in fluid communication with the actuatable valve, and each gas connector adapted for fluid communication with an adjacent control module; and a first electrical connector and a second electrical connector, each electrical connector in signal communication with the processing unit, and each electrical connector adapted for signal communication with the adjacent control module;

wherein a plurality of control modules may be daisy chain connected via the gas connectors and the electrical connectors thereby providing a modular arrangement of control modules.

5. A process for operating a gas regulation system, wherein the gas regulation system comprises a manifold, a plurality of control modules in fluid communication with the manifold, a resistance-based interlock, and a power source in electrical communication with the plurality of control modules, wherein each of the control modules comprises an actuatable valve in fluid communication with an associated gas storage device, the actuatable valve having a known resistance in an actuated state, and a circuit comprising a switch in electrical communication with the actuatable valve and the power source, wherein the resistance-based interlock is defined by an electrical series of resistances of each of the actuatable valves, the interlock being active in response to one of the actuable valves being in an actuated state, thereby defining a threshold resistance comprising the known resistance, the process comprising:

closing a selected one of the switches; and energizing the circuit defined by the closed switch to open the associated one of the actuatable valves, wherein energizing the circuit comprises supplying power to the circuit to enable actuation of the associated one of the actuatable valves, wherein the power is insufficient to overcome the threshold resistance and to actuate the associated one of the actuatable valves if more than one of the switches is closed, thereby preventing more than one of the actuatable valves from simultaneously having an actuated state.

6. The process of claim 5, further comprising:

initiating a test upon startup of the gas regulation system, wherein the test comprises commanding each one of the switches to close to provide confirmation of a complete connection.

7. The process of claim 5, further comprising reducing a gas pressure flowing from the plurality of control modules to the manifold.

8. The process of claim 5, further comprising reducing a gas pressure flowing from the gas storage device to the control module.

9. The process of claim 5, further comprising monitoring the power from a power source to the circuits and interrupting the power in the event of an actionable event.

10. The process of claim 5, further comprising:

reading a unique identifier associated with each gas storage device for tracking operational information relating to each gas storage device.

11. The process of claim 5, further comprising:

opening a valve disposed between the manifold and the plurality of the control modules; and flowing a gas between the control modules and the manifold.

12. The process of claim 11, wherein the flowing a gas comprises flowing a gas from the manifold toward the control modules at a pressure of equal to or greater than about 2000 psi.

13. The process of claim 11, wherein the flowing a gas comprises flowing a gas from the plurality of control modules toward the manifold at a pressure of equal to or less than about 200 psi.

14. The process of claim 13, wherein the flowing a gas further comprises flowing a gas from one of the plurality of control modules.

* * * * *